Jan. 31, 1967   B. LONG   3,301,651
GLASS-DRAWING APPARATUS INCLUDING REHEATING MEANS
FOR PRODUCING FLAT SHEETS
Filed Dec. 13, 1962   2 Sheets-Sheet 1

Benard Long
INVENTOR.

BY  *Karl G. Russ*

AGENT.

United States Patent Office 3,301,651
Patented Jan. 31, 1967

3,301,651
GLASS-DRAWING APPARATUS INCLUDING REHEATING MEANS FOR PRODUCING FLAT SHEETS
Bernard Long, Paris, France, assignor to G.B.D. Société Anonyme Holding, Luxembourg (Grand Duchy), a corporation of Grand Duchy of Luxembourg
Filed Dec. 13, 1962, Ser. No. 244,451
2 Claims. (Cl. 65—182)

My present invention relates to the production of flat glass of small thickness, e.g. in the form of sheets less than 6 mm. thick.

In my copending application Ser. No. 26,486, filed May 3, 1960, now Patent No. 3,140,164 issued July 7, 1964, I have disclosed a process and apparatus for producing flat glass from a vitreous melt by allowing the fluid mass to cool while passing along a substantially horizontal linear path; the cooling, in the system disclosed there, is carried out at a relatively rapid rate from below through a supporting carbonaceous bed, and at a considerably slower rate from above, in an enveloping nonoxidizing atmosphere, with continuous evacuation of developing gases through the interstices of the porous bed. Traction is imparted to the solidified downstream portion of the resulting sheet which has the fire-polished surface of mechanically drawn glass and is free from striations and other surface irregularities so frequently encountered with sheets that are drawn upwardly against the force of gravity.

The aforedescribed process is effective, however, only with relatively thick sheets, specifically those measuring upwards of 6 mm. in thickness. With thinner sheets it has not hitherto been possible to realize the desired degree of uniformity since the traction forces could not be evenly distributed; also, the tensile strength of a sheet of lesser thickness was often insufficient to permit utilization of the horizontal-drawing technique.

It is, therefore, the general object of this invention to provide means for producing thin fire-polished sheets of a quality substantially equaling that of the heavier sheets heretofore manufactured by horizontal drawing.

Another object is to provide means for producing such sheets at a considerably faster rate with conventional systems.

These objects are realized, in accordance with my instant invention, by a system which comprises means for the reheating of a central portion of a substantially solidified raw glass sheet of greater thickness, e.g. as obtained by the apparatus disclosed in my aforementioned patent, until the viscosity of that central portion has been reduced by, say, a factor of 100 or more from its original state; the longitudinal edges of the advancing sheet are, however, left substantially unheated (e.g. by being shielded from an overlying thermal radiator) so as virtually to retain the high viscosity of the raw sheet. As traction is applied to the softened central portion, the latter is progressively thinned out until it has reached the desired ultimate thickness; since this portion is framed on three sides by substantially heavier sheet portions, the tensile strength of the drawn sheet remains high and its continuity is insured. The heavier edge strips experience virtually no elongation and the width of the sheet remains approximately constant; these edge strips may, of course, be subsequently trimmed off to leave a sheet of uniform thickness.

The reheating and a preliminary cooling of the tensioned central sheet portion are advantageously carried out in an enclosure containing a nonoxidizing atmosphere (e.g. high-purity nitrogen) and an antifriction bed of nonadhering molten metal supporting the vitreous mass. The use of such a metallic bed, e.g. of tin or tin alloy, has been described in my copending application Ser. No. 12,635 filed March 3, 1960, now Patent No. 3,127,261 issued March 3, 1964. The aforesaid enclosure may also be provided with preferably adjustable shields interposable between the heat source and the edge portions of the sheet which are to be maintained in their highly viscous state. Final cooling advantageously takes place further along the sheet path, beyond the enclosure, in the region of the traction rollers which serve to advance the sheet and to tension its central portion.

The extent of the reheating should be such as to raise the sheet temperature somewhat above the softening point of the glass so that minor temperature irregularities in the surface layer of the sheet will not result in the formation of objectionable discontinuities. More particularly, with a glass having a viscosity of about $10^{4.5}$ poises when heated to a level of 1,000° C., the raw sheet may be allowed to reach a viscosity of $10^9$ to $10^{10}$ poises at the point of reheating, this viscosity being then reduced to a value of $10^6$ to $10^7$ poises in the reheated central portion.

The invention will be described in greater detail with reference to the accompanying drawing in which.

Figure 1:
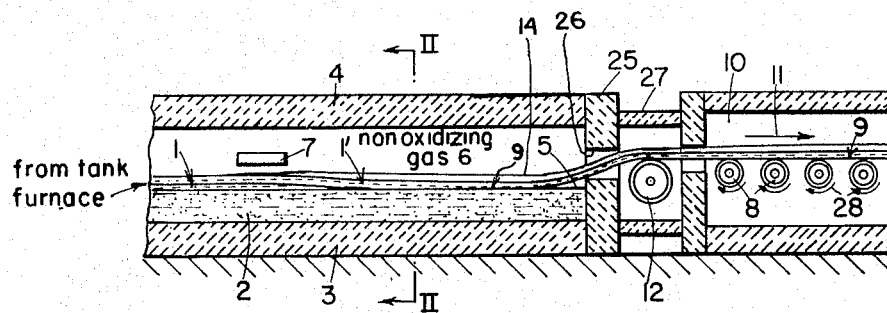
FIG. 1 is a longitudinal sectional view of an apparatus for producing flat glass in accordance with the invention.
Figure 2:
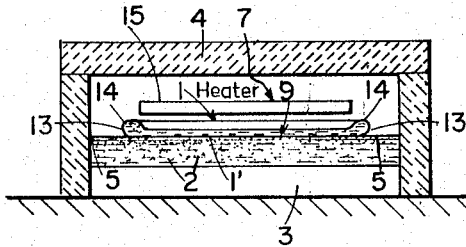
FIG. 2 is a cross-sectional view taken on the line II—II of FIG. 1.

In FIGS. 1 and 2 I have shown an enclosure of refractory material formed by an elongated trough 3, a roof 4 and an end plate 25 provided with an outlet slot 26. This enclosure, filled with a nonoxidizing gas 6 such as substantially pure nitrogen, may constitute an extension of a flow channel in which a vitreous melt from a conventional tank furnace is allowed to consolidate into a relatively thick glass sheet, e.g. in the manner disclosed in my aforementioned Patent No. 3,140,164. The raw sheet when thus produced will have fire-polished surfaces and will be in what may be described as its visco-elastic state, defined by a viscosity ranging between approximately $10^{10}$ and $10^6$ poises, upon passing through the reheating chamber constituted by the enclosure 3, 4. Within this enclosure the trough 3 supports a bed 2 of molten tin or tin alloy over which the sheet 1 slides with reduced friction. Traction is imparted to the sheet by a set of rollers 8, at a drawing point within an annealing tunnel or kiln 10, some or all of which are positively driven (as indicated by the arrows 28) to advance the sheet, in the direction of arrow 11, along a substantially horizontal linear path defined in part by the surface 5 of bath 2 and in part by the level of the rollers 8 which is slightly higher than that surface. An idler roller 12 supports the sheet on its travel through an intermediate chamber 27 connecting the tunnel 10 with the enclosure 3, 4.

As seen in FIG. 2, the sheet 1 occupies less than the full width of the bath surface 5 and is in turn overlain, for a distance slightly less than its own width, by a heating device generally designated 7 and not illustrated in detail in FIGS. 1 and 2. Heater 7 irradiates the sheet 1 from above and softens it so as to lower its viscosity to a value ranging preferably between $10^6$ and $10^7$ poises. This reheating of the partly cooled sheet is confined to a central portion 1' thereof, bounded by marginal portions 13 at the longitudinal sheet edges 14 which lie beyond the ends 15 of heater 7. Between these marginal portions 13 and the central sheet portion 1' there exist two narrow transition zones 14 in which the viscosity gradually varies from substantially its original high value of, say, $10^{10}$ poises at the edges 13 to its reduced value due to the effect of heater 7. Sheet portion 1' and, to a lesser extent, the adjoining transition zones 14 are thus reduced in thickness by the drawing force of the traction rollers 8 so that a final sheet 9 is produced; sheet 9 has a thin central body 1' flanked by edge strips 13, 14 of substantially the thickness (e.g. 6 mm. or more) of the raw sheet 1. It will be understood that the decrease in sheet thickness is determined by the speed of rollers 8 and by the intensity of heat source 7, either or both of which may be made adjustable to meet specific requirements.

The temperature of the bath 2 is maintained, by a fluid-circulation system or other temperature-control means not illustrated but known per se, at a level sufficiently below that of the heated central sheet portion 1' to exert an initial cooling effect upon the sheet 9 moving toward the exit 26, this cooling effect together with that of the chamber atmosphere 6 resulting in an at least partial temperature equalization so as to relieve objectionable thermal stresses within the sheet. Final cooling and solidification of the sheet 9 takes place in the tunnel 10. Since the sheet portion 1' entering this tunnel is effectively framed on three sides by portions of nearly solid glass, i.e. by the edge strips 13, 14 and by the still unheated part of sheet 1 adjoining its upstream end, no significant reduction in sheet width occurs between the heating device 7 and the traction rollers 8. Sheet portion 1' is of remarkable flatness and regularity even when drawn to a fraction of the thickness of original sheet 1.

The heating device 7 may be embodied in various forms and may be supplemented by shields designed to protect the edge portions 13 of the sheet from its radiation. This has been illustrated in FIGS. 3 to 6.

Figure 3:
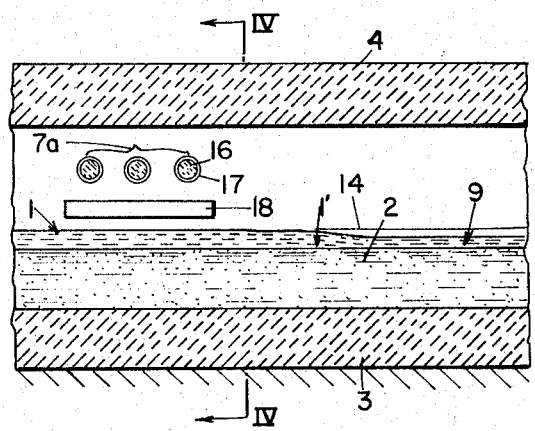
FIG. 3 is a fragmentary view of the apparatus of FIGS. 1 and 2, illustrating a specific reheating device.
Figure 4:
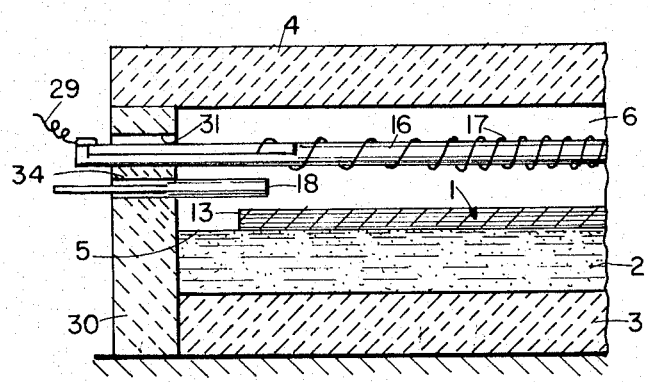
FIG. 4 is a cross-sectional view taken on the line IV—IV of FIG. 3.

In FIGS. 3 and 4 I have shown a heating device 7a consisting of a plurality of tubes 16 of refractory ceramic material, e.g. hard porcelain or sillimanite, supporting individual heating coils 17 of Nichrome wire. The wires 17 are connected by leads 29 to a source of heating current not shown. The side walls 30 of trough 3 are formed with bores 31 for the insertion of the heating elements 16, 17 and with slots 34 slidably accommodating refractory screen plates 18 which serve as heat shields and whose positions can be adjusted from without. The heating effect of the radiators 16, 17 in the region of the sheet edges may also be lessened by a construction which causes their intensity to taper off at their ends, such as an increase in the spacing of the terminal wire turns as illustrated in FIG. 4.

Figure 5:
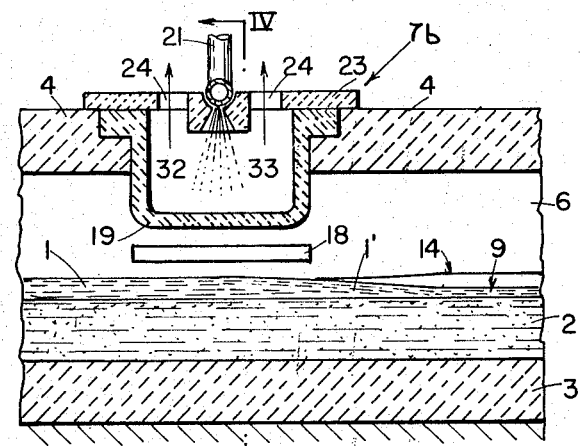
FIG. 5 is a view similar to FIG. 3, showing a modified reheating device.
Figure 6:
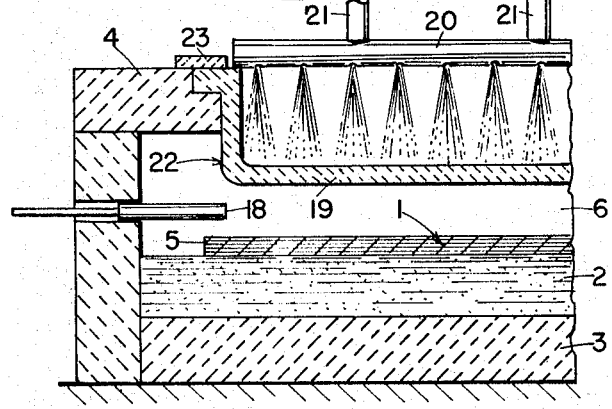
FIG. 6 is a cross-sectional view taken on the line VI—VI of FIG. 5.

According to FIGS. 5 and 6, a heating device 7b may comprise a channel-shaped body 22 which is suspended in a transverse slot of roof 4 and whose bottom plate 19 forms a radiating surface. Body 22 consists of refractory material, e.g. carborundum, so as to withstand the blast of jets 32 directed against bottom plate 19 from a horizontal burner 20 to which a combustible gas/air mixture is supplied by a fuel pipe 21. Burner 20 is cradled in a slitted boss 33 of a refractory slab 23 which overlies the open top of channel member 22 and is provided with ports 24 for the escape of the burned gases. Again, as in the preceding embodiments, the effective length of the radiant body is less than the width of the sheet 1 passing therebelow.

My invention is, of course, not limited to the specific embodiments described and illustrated but may be modified in various respects, as will be readily apparent to persons skilled in the art, without departing from the spirit and scope of the appended claims.

I claim:
1. An apparatus for producing flat glass of small thickness, comprising:
 a flow channel connected to a tank furnace for receiving therefrom a flow of liquid glass to be solidified into a sheet within said channel;
 molten-metal bath means in said flow channel for supporting and guiding said sheet along a substantially horizontal linear path to a drawing point;
 enclosure means constituting an extension of said flow channel ahead of said drawing point, said enclosure means including a pair of side walls extending along said path;
 radiant reheating means in said enclosure means extending transversely above said bath means for heating the moving sheet on its passage through said extension of the flow channel;
 roller means at said drawing point positioned to exert traction upon a central sheet portion softened by said reheating means;
 and a pair of heat shields above said bath means extending inwardly from said side walls underneath said reheating means in overlapping relationship with the lateral sheet edges for intercepting radiation directed from said reheating means toward said sheet edges while permitting unhindered irradiation of only the central sheet portion.

2. An apparatus as defined in claim 1 wherein said side walls are provided with slots, said shields being plates slidably received in said slots.

References Cited by the Examiner

UNITED STATES PATENTS

| | | | |
|---|---|---|---|
| 789,911 | 5/1905 | Hitchcock | 65—182 |
| 887,623 | 5/1908 | Gobbe | 65—182 |
| 1,128,094 | 2/1915 | Benedictus | 161—125 |
| 1,564,240 | 12/1925 | Hitchcock | 65—182 X |
| 2,208,034 | 7/1940 | Korach et al. | 161—125 |
| 2,911,759 | 11/1959 | Pilkington et al. | 65—182 X |
| 3,222,154 | 12/1965 | Pilkington | 65—182 X |

FOREIGN PATENTS

| | | |
|---|---|---|
| 239,094 | 7/1960 | Australia. |
| 732,043 | 1/1943 | Germany. |

DONALL H. SYLVESTER, *Primary Examiner.*

F. W. MIGA, *Assistant Examiner.*